(12) United States Patent
Säily et al.

(10) Patent No.: US 12,549,425 B2
(45) Date of Patent: Feb. 10, 2026

(54) PEAK-TO-AVERAGE POWER RATIO LIMITATION

(71) Applicant: Nokia Technologies Oy, Espoo (FI)

(72) Inventors: Mikko Säily, Espoo (FI); Risto Ilari Wichman, Helsinki (FI); Mehmet Cagri Ilter, Espoo (FI)

(73) Assignee: Nokia Technologies Oy, Espoo (FI)

( * ) Notice: Subject to any disclaimer, the term of this patent is extended or adjusted under 35 U.S.C. 154(b) by 55 days.

(21) Appl. No.: 18/722,626

(22) PCT Filed: Dec. 22, 2021

(86) PCT No.: PCT/EP2021/087248
§ 371 (c)(1),
(2) Date: Jun. 21, 2024

(87) PCT Pub. No.: WO2023/117073
PCT Pub. Date: Jun. 29, 2023

(65) Prior Publication Data
US 2025/0055744 A1  Feb. 13, 2025

(51) Int. Cl.
*H04L 27/26* (2006.01)
*H04L 25/02* (2006.01)
*H04L 25/03* (2006.01)

(52) U.S. Cl.
CPC ........ *H04L 27/262* (2013.01); *H04L 25/0228* (2013.01); *H04L 25/03343* (2013.01); *H04L 27/2626* (2013.01)

(58) Field of Classification Search
CPC ............... H04L 27/262; H04L 25/0228; H04L 25/03343; H04L 27/2626; H04L 27/2623
See application file for complete search history.

(56) References Cited

U.S. PATENT DOCUMENTS

| | | |
|---|---|---|
| 6,597,746 B1 * | 7/2003 | Amrany ............ H04L 27/2614 375/296 |
| 6,680,978 B1 | 1/2004 | Schneider et al. |
| 10,651,865 B2 | 5/2020 | Bhandari et al. |

(Continued)

FOREIGN PATENT DOCUMENTS

WO  2009/096345 A2  8/2009

OTHER PUBLICATIONS

Rahmatallah et al., "Peak-to-Average Power Ratio Reduction in OFDM Systems: A Survey And Taxonomy", IEEE Communications Surveys & Tutorials, vol. 15, No. 04, Fourth Quarter, 2013, pp. 1567-1592.

(Continued)

*Primary Examiner* — David S Huang
(74) *Attorney, Agent, or Firm* — Nokia Technologies

(57) ABSTRACT

An embodiment provides a method comprising: generating a digital-form time-domain signal; carrying out a modulo-based operation to an amplitude of the generated digital-form time-domain signal or to in-phase and quadrature branches of the generated digital-form time-domain signal separately, wherein a divisor of the modulo-based operation has a pre-defined value smaller than a maximum of an amplitude of the digital-form time-domain signal for limiting a peak-to-average ratio of the digital-form time-domain signal, and carrying out digital-to-analogue conversion to the digital form time-domain signal for transmission.

19 Claims, 7 Drawing Sheets

(56) References Cited

U.S. PATENT DOCUMENTS

2003/0231581 A1* 12/2003 Son .................. H04L 27/3411
370/208
2016/0043783 A1 2/2016 Xia et al.

OTHER PUBLICATIONS

Han et al., "An Overview of Peak-to-Average Power Ratio Reduction Techniques for Multicarrier Transmission", IEEE Wireless Communications, vol. 12, No. 02, Apr. 2005, pp. 56-65.

Itoh, "Analysis of the phase unwrapping algorithm", Applied Optics, vol. 21, No. 14, Jul. 15, 1982, 1 page.

Bhandari et al., "On Unlimited Sampling and Reconstruction", IEEE Transactions on Signal Processing, vol. 69, Jul. 15, 2021, pp. 3826-3838.

"3rd Generation Partnership Project; Technical Specification Group Radio Access Network; NR; Physical layer; General description (Release 16)", 3GPP TS 38.201, V16.0.0, Dec. 2019, pp. 1-13.

"3rd Generation Partnership Project; Technical Specification Group Radio Access Network; NR; Services provided by the physical layer (Release 16)", 3GPP TS 38.202, V16.2.0, Sep. 2020, pp. 1-17.

Invitation to Pay Additional Fees received for corresponding Patent Cooperation Treaty Application No. PCT/EP2021/087248, dated Aug. 16, 2022, 9 pages.

International Search Report and Written Opinion received for corresponding Patent Cooperation Treaty Application No. PCT/EP2021/087248, dated Oct. 7, 2022, 14 pages.

* cited by examiner

PEAK-TO-AVERAGE POWER RATIO LIMITATION

RELATED APPLICATION

This application claims priority to PCT Patent Application No. PCT/EP2021/087248, filed Dec. 22, 2021 which is incorporated herein by reference in its entirety.

TECHNICAL FIELD

Various example embodiments relate to wireless communications.

BACKGROUND

Crest factor is a parameter of a waveform, indicating the ratio of peak values to the effective value. In other words, crest factor indicates the magnitude of peaks are in a waveform. The peak-to-average power ratio (PAPR) usually expressed in dB, is the power level of the highest instantaneous power compared to the average power level.

Both orthogonal frequency division multiple access (OFDM) and code division multiple access (CDMA) have high peak-to-average power ratio or PAPR (sometimes referred as peak-to-average ratio, PAR). A high PAPR means that the signal power fluctuates to a large value and thus linear transmission amplification circuits are required to operate over a wide power range. In radio communication systems, signals are amplified using this kind of power amplifiers (PA) especially on the access node side. These power amplifiers are power consuming.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
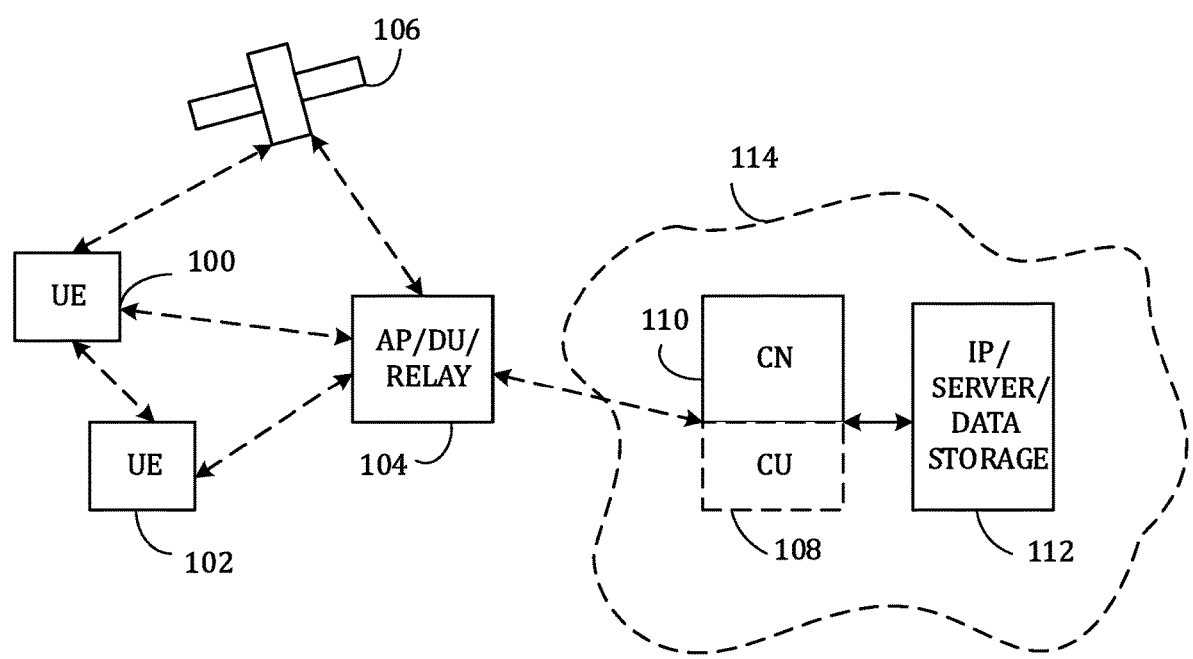
FIG. 1 illustrates an example of a wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/outdoor small cell (a micro, femto, or a pico cell). The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to carry out one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas (each of which may comprise multiple antenna elements), many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent.

Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

6G architecture is targeted to enable easy integration of everything, i.e., a network of networks, joint communication and sensing, non-terrestrial networks and terrestrial communication, encompassing machine learning algorithms as well as local and distributed computing capabilities, where virtualized network functions can be distributed over core and edge computing resources. Far edge computing, where computing resources are pushed to the very edge of the network, will be part of the distributed computing environment, for example in "zero-delay" scenarios.

More generally, the actual (radio) communication system is envisaged to be comprised of one or more computer programs executed within a programmable infrastructure, such as general-purpose computing entities (servers, processors, and like).

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) NodeBs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

The system of FIG. 1 may employ orthogonal frequency division multiplexing (OFDM) for implementing mobile broadband communications. OFDM modulation is known to be sensitive to frequency offset (Doppler, oscillator, RF impairment etc.), and the transmitted time-domain signal typically has a large peak-to-average power ratio (PAPR) leading to a reduced or compromised transmitter efficiency. PAPR for a given signal may be defined as the peak amplitude of the signal squared (giving the peak power) divided by the root-mean-squared (RMS) amplitude of the signal squared (giving the average power). High PAPR results in high requirements for the transceiver implementation, especially for the terminal device (such as the terminal devices 100, 102) leading to a transmitter with high cost and complexity.

The most effective operation point of a power amplifier is at the saturation level. To reproduce the large dynamic range of the OFDM waveform, the power amplifier has to shift the average operating power from the saturation level by applying input back-off, which is proportional to PAPR. For example, if a transmitter transmits at 20 dBm average power and PAPR is 10 dB, the power amplifier should be capable of transmitting at a 30 dBm level. In practice, power back-off is a tradeoff between efficiency and distortion.

Embodiments describe a method and a device to apply modulo-based PAPR reduction and therefore lower dynamic range of the transmitter signal. The radio transmitter according to embodiments exhibits improved transmitter efficiency (w.r.t. clipper based PAPR reduction). On the other hand, the radio receiver according to embodiments provides improved recovery of the signal, compared to the clipper base PAPR reduction.

The modulo-based PAPR reduction approach according to embodiments can be used to reduce PAPR of an arbitrary signal, not only OFDM signal.

Examples of use cases include:
   Power harvesting devices, which are required to have efficient transmitters to allow longer information cycles w.r.t. to power harvesting cycle.
   Asset Tracking to allow low-power tags to transmit efficiently the wideband uplink positioning reference symbols, e.g., a sounding reference signal (SRS), since the relative efficiency of the proposed PAPR reduction method increases with the number of sub-carriers compared to prior-art.

Figure 2:
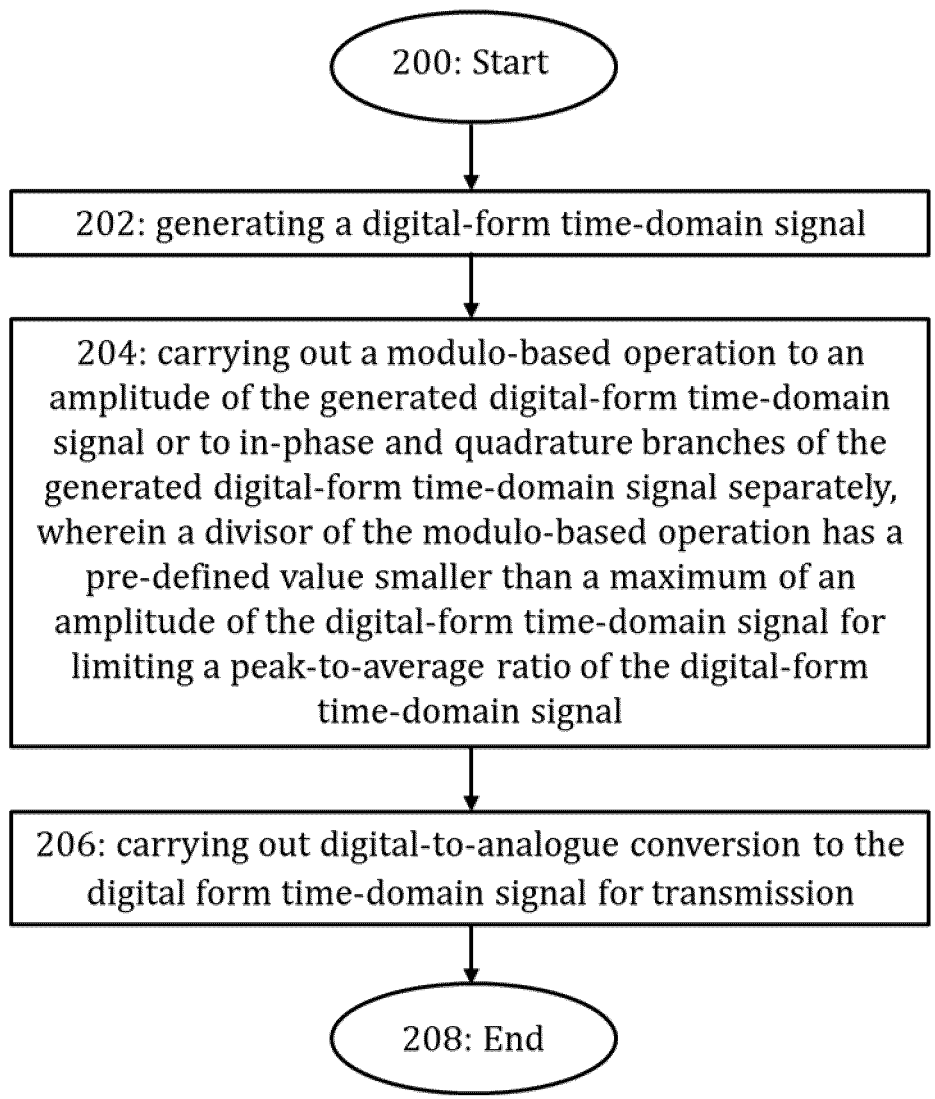
FIG. 2 is a flow chart.

FIG. 2 illustrates a method for carrying out modulo-based PAPR reduction. The process may be carried out by an apparatus (e.g., a computing device) at a transmitter side. Said apparatus may, e.g., form a part of a radio transmitter or transceiver or be connected thereto. Said apparatus may be, e.g., a baseband processing device of the radio transmitter or radio receiver or a part thereof. Alternatively, the apparatus may be a radio transmitter or transceiver. The radio transmitter or transceiver may be comprised in an access node (such as the access node 104 of FIG. 1) or in a terminal device (such as one of the terminal devices 100, 102 of FIG. 1).

The method starts in block 200.

In block, 202, a digital-form time-domain signal is generated.

A digital time-domain signal may be generated for digital-to-analog conversion and sub-sequent transmission. The generating may comprise, e.g., forming a digital time-domain signal from (OFDM, for example, but not limited to)

data symbols (and optionally at least one preamble and/or at least one pilot symbol) and oversampling and/or digitally processing (e.g., filtering and/or windowing) said digital time-domain signal. How the digital time-domain signal may be generated will be discussed in more detail in connection with elements 301 to 305 of FIG. 3.

As also discussed in more detail in connection with FIG. 3, the digital time-domain signal may, in some embodiments, correspond to an in-phase (I) or a quadrature (Q) signal component to be processed in a I or Q branch of the apparatus (or of the radio transmitter or transceiver).

In block 204, a modulo-based operation is carried out to an amplitude of the generated digital-form time-domain signal or to in-phase and quadrature branches of the generated digital-form time-domain signal separately, wherein a divisor of the modulo-based operation has a pre-defined value smaller than a maximum of an amplitude of the digital-form time-domain signal for limiting a peak-to-average ratio of the digital-form time-domain signal.

The pre-defined value of the divisor of the modulo-based operation is denoted, in the following, with the symbol a. In other words, a is defined such that the application of the modulo-based operation to the digital time-domain signal results in an amplitude-limited signal (compared to the digital time-domain signal).

The modulo-based operation is an operation which gives the remainder following a division by a divisor. A modulo operation is written typically as r=a mod n, where r is called a residual, a is any real number and n is called a divisor. In the following, the alternative notation r=mod($\alpha$,n) is used for improved clarity. Typically, the following conditions apply for the modulo-based operation:

$$a = nq + r \quad (1)$$

wherein the quotient q is an integer and $$|r| < |n|. \quad (2)$$

These two conditions, however, lead to the fact modulo-based operation is not uniquely defined. In the following, the symbol a is used for the divisor.

The modulo-based operation may be defined to give values in a symmetrical region (or range) r∈(−$\alpha$,$\alpha$) or in an asymmetric region r∈[0,$\alpha$). Either of said definitions may be employed in connection with embodiments.

The modulo-based operation corresponding to the symmetrical region r∈(−$\alpha$,$\alpha$) may be defined, for example, according to $$\mod(x, \alpha) = x - 2\alpha\left(1 + floor\left(\frac{x}{2\alpha} - \frac{1}{2}\right)\right), \quad (3)$$

wherein x is a digital signal to which the modulo-based operation is applied, and "floor" corresponds to a floor function (i.e., a function outputting the greatest integer less than or equal to the input).

The modulo-based operation corresponding to the asymmetrical region r∈[0,$\alpha$) may be defined, for example, according to $$\text{Mod}(x, \alpha) = x - \alpha\, floor\left(\frac{x}{\alpha}\right) \quad (4)$$

In some embodiments, the modulo-based operation is applied to an amplitude of the digital time-domain signal to be transmitted (i.e., to a quantity having only non-negative values). In this case, the modulo-based operation applied to a signal x may be given by mod (∥x∥, $\alpha$)$e^{j*arg(x)}$. In such embodiments, the modulo-based operation may be defined to produce values within said asymmetric region of [0,$\alpha$) using, e.g., either of the two definitions of the modulo-based operation. In other embodiments, the digital time-domain signal obtained in block 202 may correspond to an in-phase (I) signal component or a quadrature (Q) signal component and the process of FIG. 2 may be repeated for the other one of the I and Q signal components. In such embodiments, the modulo-based operation may be applied separately for the I and Q signal components. The modulo-based operation defined for the symmetric region r∈(−$\alpha$,$\alpha$) may be used in this case. It should be noted that all or most of the other digital processing steps may also be carried out separately for the I and Q signal components. The I and Q signal components may be combined in the radio front-end of the radio transmitter or transceiver before transmission. The characteristic 90° phase shift between the I and Q signal components may also be implemented in an IQ mixer of the radio front end.

In some embodiments, the pre-defined value $\alpha$ of the divisor is defined such that a norm of a first order difference calculated for the digital time-domain signal is smaller than said pre-defined value for all samples. In other words, the following equation holds:

$$\|\Delta^1 y\| < \alpha, \quad (5)$$

wherein y is the digital time-domain signal (i.e., the digital time-domain signal following any up-sampling and/or waveform processing such as filtering) and $\Delta^1$ denotes the first order difference operator. The first order difference operator $\Delta^1$ is defined as $$\Delta^1 y[n] = y[n] - y[n-1], \quad (6)$$

wherein y[n] is nth sample of said digital signal vector y. Alternatively, the first-order difference can be denoted by diff (y[n],1)=y[n]−y[n−1]. The first order difference for the first sample may be defined to have a pre-defined value (e.g., zero). The variable n may have values n=1, . . . , LN, where L is a transmission oversampling factor and N is the number of samples without oversampling. Depending on the signal reconstruction scheme and reception oversampling rate used in the target radio receiver or transceiver, satisfying said criterion may or may not be critical to signal recovery without errors, as will be described in detail below.

In block 206, digital-to-analogue conversion is carried out to the digital form time-domain signal for transmission.

The amplitude-limited analog time-domain signal produced by the digital-to-analog conversion may be processed in a radio front end of the radio transmitter or transceiver following any radio frequency (RF) processing steps (e.g., involving filtering, frequency mixing and/or power-amplification) and subsequently transmitted via at least one antenna of the radio transmitter or transceiver.

In some embodiments, the apparatus may low-pass-filter the amplitude-limited digital time-domain signal, before the digital-to-analog conversion to decrease out-of-band distortion caused by the application of the modulo-based operation. In other embodiments, corresponding functionality may be implemented in the analog domain (using a low-pass analog filter) following the digital-to-analog conversion.

Additionally, the transmission may comprise a predefined sequence (a pilot/preamble signal) not modified by the modulo-based operation for being used in channel estimation for signal equalization in the receiver side.

The method ends in block 208.

Figure 3:
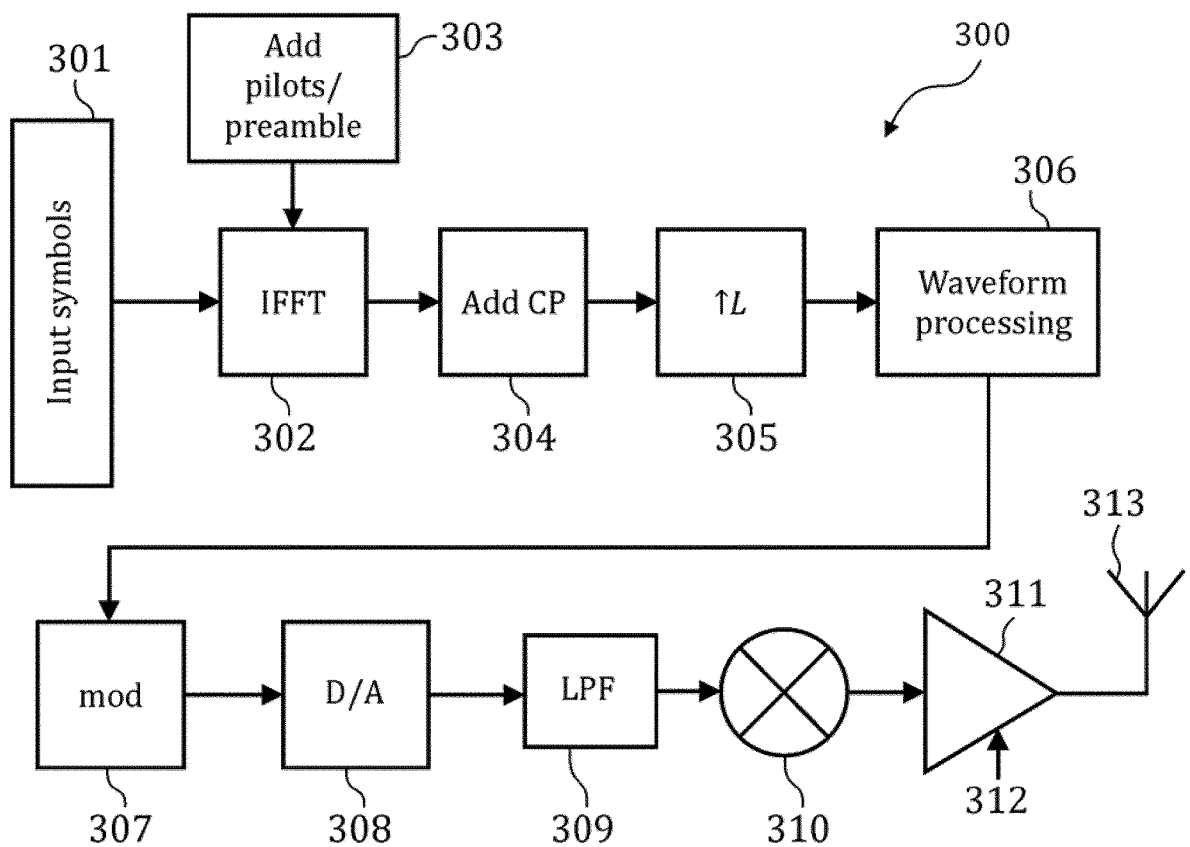
FIG. 3 illustrates an example of a radio transmitter structure.

FIG. 3 illustrates an example of a radio transmitter structure for carrying out modulo-based PAPR reduction described above by means of FIG. 2. The illustrated radio transmitter 300 may be an OFDM radio transmitter, but not limited to. The radio transmitter 300 may form a part of a radio transceiver. The radio transmitter 300 may be comprised in an access node (such as the access node 104 of FIG. 1) or in a terminal device (such as one of the terminal devices 100, 102 of FIG. 1). The radio transmitter (or one or more parts thereof) may be configured to carry out the method of FIG. 2.

Referring to FIG. 3, the actions pertaining to blocks 301 to 307 may be carried out digitally by at least one digital processing unit of the radio transmitter (e.g., a baseband processing unit) or a part thereof. In the following, the actor for these elements may simply be called the radio transmitter.

The transmission process may be initiated by the radio transmitter by obtaining, in block 301, at least one (input) data symbol for transmission. Said at least one data symbol may be, e.g., retrieved from a memory or received from outside the radio transmitter. Each data symbol 301 may correspond to a complex number according to a particular modulation scheme, e.g., QPSK (quadrature phase shift keying) or 16-QAM (16 quadrature amplitude modulation).

The radio transmitter may insert, in block 303, at least one preamble and/or at least one pilot symbol to said at least one data symbol to form a preliminary digital frequency-domain signal for transmission. Said at least one preamble and/or at least one pilot symbol corresponds to unmodulated data usable for synchronization and channel estimation. Said at least one preamble may be inserted into the beginning of said at least one data symbol (in time) and/or said at least one pilot symbol (defined, e.g., as a complex exponential in time) may be inserted or embedded into each of said at least one symbol such that said at least one pilot symbol may be separated from said at least one data symbol in the frequency-domain. Said at least one preamble and/or at least one pilot symbol may be used by the radio receiver for calculating channel state information (CSI). Block 303 may be considered optional.

In some embodiments, said at least one preamble inserted in block 303 may be defined to have a low peak-to-average power ratio (PAPR) such that said at least one preamble (i.e., a preamble sequence) is not affected by the modulo-based operation (with the divisor of the pre-defined value α). In other words, said at least one preamble may not be amplitude-limited or cut-off by the modulo-based operation. For example, Zadoff-Chu (ZC) sequences may be used for defining said at least one preamble satisfying said criterion in time and frequency domains simultaneously.

In the case of OFDM, the elements 301, 302, 303 may be defined as follows. The input data symbols 301 may correspond to $L_{act}$ data symbols $s_0, s_1, s_2, \ldots, s_{L_{act}-1}$ in series format. As mentioned above, each data symbol 301 may correspond to a complex number according to a modulation scheme, e.g., QPSK (quadrature phase shift keying) or 16-QAM (16 quadrature amplitude modulation). From the point of view of the IFFT processing, each data symbol 301 in the series corresponds to a certain carrier frequency. Said data symbols 301 in series are provided as an input for a serial to parallel converter (not shown in FIG. 3). The serial to parallel converter separates the data symbols 301 to $L_{act}$ parallel data streams to which the IFFT may be applied in block 302. In some cases, the parallel data streams may be padded with one or more zeros. The IFFT processing block 302 modulates the input data symbols (corresponding to values assigned to frequency bins) and provides $L_{OFDM}$ parallel output signals $x_0, x_1, x_2, \ldots, x_{L_{OFDM}-1}$ (time-domain signals). Due to the intrinsic properties of the IFFT (or Fourier transform in general), the generated carrier signals are always orthogonal. The parallel output signals may be provided as an input to a parallel to serial converter (not shown in FIG. 3) which forms an output signal $x_{out}$ comprising one OFDM symbol (or equally OFDM symbol block) of $L_{OFDM}$ samples.

The radio transmitter may apply, in block 302, an inverse orthogonal transform to the preliminary digital frequency-domain signal to form a preliminary digital time-domain signal. Here, the orthogonal transform may be one of a fast Fourier transform, a discrete Fourier transform, a Hartley transform and a number theoretic transform. In some embodiments, the orthogonal transform may be, e.g., a fast Fourier transform or a discrete Fourier transform.

As presented above, at least one preamble may be inserted in block 303 such that said at least one preamble (i.e., a pre-amble sequence) is not affected by the modulo-based operation (with the divisor of the pre-defined value α).

In order to prevent the deterioration of the performance of the radio link due to multipath delay spread (that is, due to different multipath components of the transmitted signal arriving at the receiver at different times), a so-called cyclic prefix (CP) may be introduced to the data symbols. Accordingly, the radio transmitter may insert, in block 304, at least one cyclic prefix to the preliminary time-domain digital signal. The cyclic prefix refers to an extension of a symbol by inserting a copy of $L_{CP}$ last samples of a symbol to the beginning of said symbol. Said process leads to an extended, but still continuous data symbol (called a CP-OFDM symbol in connection OFDM). By choosing the cyclic prefix to be longer than the delay spread, the adverse effects of the delay spread (e.g., loss of orthogonality leading to inter symbol interference, ISI) may be avoided. Usually, when symbol time is increased, the maximum achievable bit rate of transmission is reduced. In the receiver, an inverse process may be carried out in order to remove the cyclic prefix.

The radio transmitter may oversample, in block 305, the preliminary time-domain digital signal following said insertion of said at least one cyclic prefix by a transmission oversampling factor L. A signal is said to be oversampled by an oversampling factor of L if it is sampled at L times the Nyquist rate. The transmission oversampling factor may be defined, for example, to be equal to or larger than 2 or equal to or larger than 3. Optionally, oversampling may be carried out in frequency domain (e.g., already before the inverse orthogonal transform in block 302), instead of time-domain.

The radio transmitter may carry out, in block 306, waveform processing on the digital time-domain signal (following the oversampling) for forming a digital time-domain signal for transmission. The waveform processing may comprise, for example, pulse shaping, filtering and/or windowing. Optionally, the oversampling (block 305) may form a part of the waveform processing in block 306.

The digital time-domain signal produced in block 306 may correspond to the digital time-domain signal mentioned in connection with block 202 of FIG. 2 (i.e., the digital time-domain signal to which the modulo-based operation may be applied). In other words, the generating in block 202 of FIG. 2 may correspond to blocks 301 to 306 of FIG. 3.

Following the waveform processing in block 306, the radio transmitter may apply, in block 307, a modulo-based operation to the digital time-domain signal to form an amplitude-limited digital time-domain signal. The divisor of the modulo-based operation may have a pre-defined value $\alpha$ smaller than a maximum of an amplitude of the digital time-domain signal. Block 307 may correspond to carrying out the modulo-based operation of block 204 of FIG. 2.

The radio transmitter may carry out, in block 308, digital-to-analog conversion to the amplitude-limited digital time-domain signal for producing an amplitude-limited analog time-domain signal (an analog baseband signal). Block 308 may correspond to the digital-to-analogue conversion of block 206 of FIG. 2. Digital low-pass filtering may be applied before said digital-to-analog conversion for filtering out-of-band distortion caused by the modulo-based operation.

The elements 309 to 313 may correspond to an RF front end of the radio transmitter 300 (or a part thereof). It should be noted that FIG. 3 shows only one simplistic example of a RF front end. In other embodiments, further elements conventionally included in a transmitter RF front end. Said further elements may comprise, e.g., one or more of the following elements: a filter, an image rejection filter, a switch, a combiner (for combining I and Q signal components), a local oscillator, a duplexer, a baseband filter, a baseband amplifier, an intermediate frequency (IF) filter and an IF amplifier.

Following the analog-to-digital conversion in block 308, the amplitude-limited analog time-domain signal may be filtered using a low-pass filter 309 (i.e., an analog low-pass filter). Said low-pass filter 309 (or another low-pass filter provided in addition to the low-pass filter 309) may be configured to filter out out-of-band distortion caused by the applying of the modulo-based operation. Alternatively, the low-pass filter 309 may be omitted (e.g., if digital low-pass filtering is carried out before the digital-to-analog conversion or if out-of-band distortion may simply be tolerated).

The filtered amplitude-limited analog time-domain signal may be mixed with a local oscillator signal, in the mixer 310, to create a radio frequency signal for transmission. Before transmission, the radio frequency signal may be amplified in a power amplifier 311. Element 312 corresponds to a direct current (DC) bias signal input into the power amplifier 311. The power-amplified radio frequency signal may be transmitted via at least one antenna 313 of the radio transmitter to a target receiver or transceiver.

In some embodiments, the actions described in connection with blocks 301 to 310 may be carried out separately for two separate signals corresponding to I and Q signal components of the signal to be transmitted. In other words, the elements 301 to 310 may correspond to elements for creating an I signal component while another corresponding set of elements (not shown in FIG. 3) may be provided for processing a Q signal component (or vice versa). In other words, the elements 301 to 310 shown in FIG. 3 may correspond to an I branch of the radio transmitter while Q branch of the radio transmitter comprising similar elements is not shown in FIG. 3 for simplicity of presentation. The elements 301 to 309 (or a part thereof) may be defined in a substantially similar manner for both I and Q branches.

Assuming that the filtered analog time-domain signal output by the lowpass filter 309 corresponds to an I signal, the mixer 310 may be configured to mix the filtered analog time-domain signal with an in-phase (0°) local oscillator signal for creating an I phase signal component of the radio frequency signal to be transmitted. Another mixer (not shown in FIG. 3) may be configured to mix another filtered analog time-domain signal corresponding Q branch of the radio transmitter with a quadrature (90°) local oscillator signal for creating a Q signal component of the radio frequency signal to be transmitted. Said two mixers 310 may correspond to two (double-balanced) mixers or mixer cores 310 forming together an IQ mixer. The local oscillator signals may be generated, e.g., by a local oscillator via a 0°/90° phase shifting element (not shown in FIG. 3).

The I and Q signal components of the radio frequency signal to be transmitted (i.e., the I and Q transmission branches of the radio transmitter) may be combined, following the IQ mixer 310, using a combiner (not shown in FIG. 3). Thus, the power-amplification by the power amplifier 311 and transmission via said at least one antenna 313 may be carried out for a combined IQ radio signal.

Figure 4:
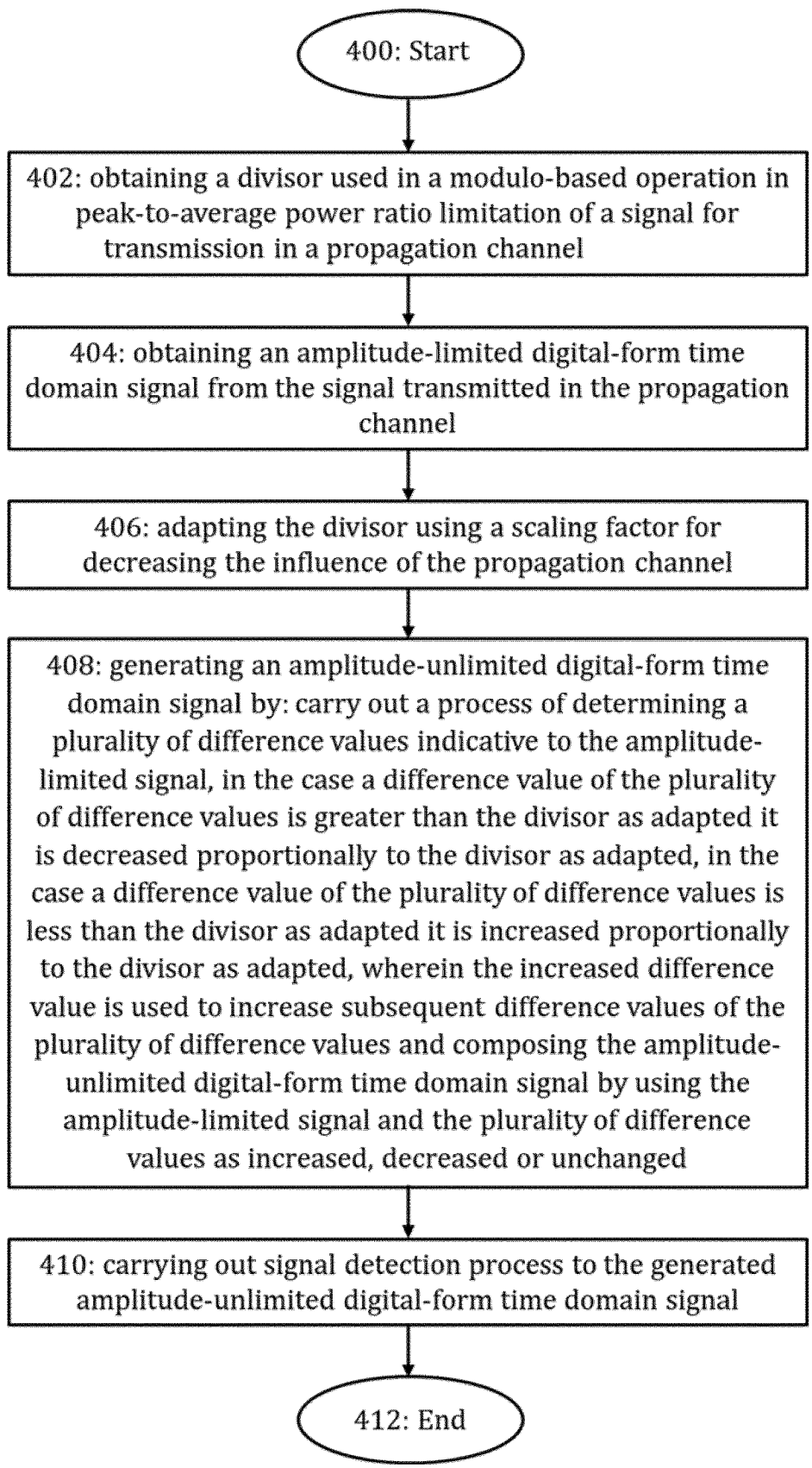
FIG. 4 is another flow chart.

FIG. 4 illustrates an example of a method for being carried out at the receiver side. The method is suitable for reconstructing a signal which has been limited for transmission in the radio path using modulo-based PAPR reduction operation. The process may be carried out by an apparatus (e.g., a computing device) at the receiving end. Said apparatus may form a part of a radio receiver or transceiver or be connected thereto. Said apparatus may be, e.g., a baseband processing device of the radio transmitter or radio receiver or a part thereof. Alternatively, the apparatus may be a radio receiver or transceiver. The radio transmitter or transceiver may be comprised in an access node (such as the access node 104 of FIG. 1) or in a terminal device (such as one of the terminal devices 100, 102 of FIG. 1).

The method starts in block 400.

In block 402, a divisor used in a modulo-based operation in peak-to-average power ratio limitation of a signal for transmission in a propagation channel is obtained.

The analog time-domain signal received by the radio transmitter or transceiver signal is an amplitude-limited signal which has been limited, prior to transmission, by applying a modulo-based operation with a divisor having a predefined value $\alpha$ as described above.

The divisor may be obtained as signaled from the transmitter side. The signal may be a specific signal indicating the divisor, or it may be indicated as a part of the transmission of the modulo-based PAPR limited signal.

The information on said pre-defined value of the divisor $\alpha$ used in transmission may be communicated from the radio transmitter side to the radio receiver side using various different means, for example, as a pre-defined value of the divisor $\alpha$ to the target radio receiver or transceiver in a control signaling message or in a control part of the transmission of the modulo-based operated signal, wherein the control-part is processed with the modulo-based operation. Some examples are in-band signalling, as a part of Layer-1

(L1) configuration, as a Medium Access Control Control Element (MAC CE) or mapped to a part of the amplitude-limited analog signal transmitted by the radio transmitter or transceiver not affected by the modulo-based operation.

Correspondingly, the information may be received from the source radio transmitter or transceiver as in-band signalling, as a part of L1 configuration, as a MAC CE or mapped to a part of the amplitude-limited analog signal transmitted by the radio transmitter or transceiver not affected by the modulo-based operation.

In block 404, an amplitude-limited digital-form time domain signal from the signal transmitted in the propagation channel is obtained.

An analog-to-digital conversion may be carried out for converting an analog time-domain signal received by a radio receiver or transceiver from a source radio receiver or transceiver to a digital time-domain signal. Optionally, oversampling by a pre-defined reception oversampling factor may be employed in the analog-to-digital conversion. Between the reception via at least one antenna of the radio receiver or transceiver and the analog-to-digital conversion, the received analog signal may have been processed in the radio front end of the radio receiver or transceiver (e.g., filtered, amplified and/or mixed in a mixer), as will be discussed in connection with FIG. 5. For example, the received signal may be bandlimited by an anti-alias filter of the radio front-end of the radio receiver. The received analog time-domain signal may have been transmitted according to the process of FIGS. 2 and/or 3.

Since there are two options for the modulo-based operation, either it has been carried out to the amplitude of the signal or I and Q branches separately, this option may also be indicated.

In block 406, the divisor is adapted using a scaling factor for decreasing the influence of the propagation channel.

The propagation channel between the radio transmitter and the radio receiver scales the transmitted signal which, in turn, leads usually also to scaling of the pre-defined value of the divisor of the modulo-based operation. Thus, the digital time-domain signal in reception may be amplitude-limited by a modulo-based operation with the divisor having a scaled value $\alpha_{sc}$ relative to said pre-defined value $\alpha$ used in the transmitting end.

Said scaled value $\alpha_{sc}$ of the divisor may be pre-defined (e.g., known based on previous transmissions using the same communication link) or determined based on the digital time-domain signal (e.g., based on its dynamic range). The adaptation or scaling is clarified by examples below.

In block 408, an amplitude-unlimited digital-form time domain signal is generated by:
carrying out a process of determining a plurality of difference values indicative to the amplitude-limited signal, in the case a difference value of the plurality of difference values is greater than the divisor as adapted it is decreased proportionally to the divisor as adapted, in the case a difference value of the plurality of difference values is less than the divisor as adapted it is increased proportionally to the divisor as adapted, wherein the increased difference value is used to increase subsequent difference values of the plurality of difference values and composing the amplitude-unlimited digital-form time domain signal by using the amplitude-limited signal and the plurality of difference values as increased, decreased or unchanged.

An amplitude-unlimited digital time-domain signal can be said to be based on the digital time-domain signal (being an amplitude-limited signal) and the scaled value for the divisor $\alpha_{sc}$ using a signal recovery method.

Similar to as discussed for the transmitter-side operation, the (amplitude-limited) digital time-domain signal and the amplitude-unlimited digital time-domain signal may correspond to an I or a Q signal component to be processed in a I or Q branch of the apparatus (or of the radio receiver or transceiver). In such embodiments, the method may be repeated for another digital time-domain signal corresponding to the other one of the I and Q signal components. In these embodiments, the modulo-based operation may have the aforementioned symmetric definition, i.e., $(-\alpha_{sc}, \alpha_{sc})$.

Also similar to as discussed for the transmitter-side operation, the signal recovery may be carried out for the amplitude of the digital time-domain signal, instead of the digital time-domain signal as whole. In such embodiments, the modulo-based operation may have the aforementioned asymmetric definition, i.e., $[0, \alpha\_sc)$. the radio transmitter and the radio receiver should be configured in a similar manner that is, to apply the modulo-based operations to the amplitude or to the whole signal and to use the same definition for the modulo-based operation.

Let us define the value $\beta_{sc}$ to be the half of the range of the region. Thus, in case of the symmetric region $(-\alpha_{sc}, \alpha_{sc})$, $\beta_{sc} = \alpha_{sc}$, and for asymmetric region $[0, \alpha_{sc})$, $\beta_{sc} = \alpha_{sc}/2$.

A plurality of signal recovery methods is suitable for the purpose. A couple of signal recovery methods are presented as examples below.

According to a first signal recovery method, the amplitude-unlimited time-domain digital signal may be generated by carrying out the following steps for samples of the digital time-domain signal.

An initial sample of the digital time-domain signal is obtained. Then, a first order difference for said sample of the digital time-domain signal is determined. The first order difference may be determined as a difference between two consecutive samples of a digital signal.

In response to the first order difference for the given sample being larger than the scaled value of the divisor $\alpha_{sc}$, values of said given sample and successive samples of the digital time-domain signal are incremented by a negative of said scaled value of the divisor multiplied by two (i.e., by $-2\alpha_{sc}$).

In response to the first order difference for the given sample being smaller than a negative of the scaled value $\alpha_{sc}$, values of said given sample and successive samples of the digital time-domain signal are incremented by said scaled value of the divisor multiplied by two (i.e., by $+2\alpha_{sc}$).

In response to the first order difference for the given sample failing to satisfy either of the conditions or in response to completion of either of the incrementation steps, the process proceeds to the next sample of the digital time-domain signal. The process may be repeated until all the samples of the digital time-domain signal have been covered (i.e., until the first order difference has been calculated for all samples, usually per a block).

In the procedure described above, it was assumed that the modulo-based operation was applied in the transmitting end to the whole (I and Q) signal (not only to its amplitude) and, thus, the samples of the digital time-domain signal were expected to be withing a range of $(-\alpha_{sc}, \alpha_{sc})$. In cases where the modulo-based operation is applied in the transmitting end to the amplitude of the signal, the second signal recovery method is applied correspondingly only to the amplitude of the digital time-domain signal. In such a case, the process may be carried out as follows:

An initial sample of the amplitude of the digital time-domain signal is obtained. Then, the apparatus determined a first order difference for said sample of the amplitude of the digital time-domain signal. The first order difference may be defined as a difference between two consecutive samples of a digital signal.

In response to the first order difference for the given sample being larger than the scaled value of the divisor divided by two $\alpha_{sc}/2$, values of said given sample of the amplitude and successive samples of the amplitude of the digital time-domain signal are incremented by a negative of said scaled value of the divisor (i.e., by $-\alpha_{sc}$).

In response to the first order difference for the given sample being smaller than a negative of the scaled value divided by two $-\alpha_{sc}/2$, values of said given sample and successive samples of the amplitude of the digital time-domain signal are incremented by said scaled value of the divisor (i.e., by $+\alpha_{sc}$).

In response to the first order difference for the given sample failing to satisfy either of the conditions or in response to completion of either of the incrementation steps, the procedure proceeds to the next sample of the amplitude of the digital time-domain signal. The process may be repeated until all the samples of the amplitude of the digital time-domain signal have been covered (i.e., until the first order difference has been determined for all samples in a block).

A short description of an example of the procedure:
1. The receiver obtains the amplitude-limited digital signal vector y after reversing the distortion caused by the channel.
2. The receiver calculates the first-order difference $d(n)=y(n)-y(n-1)$ at time instant n, $n=2, \ldots, N$ (or $1, \ldots, N-1$ if indexing starts from 0) from the amplitude-limited signal vector y of N samples. The receiver starts by calculating d(2) and repeats the calculation for the samples $y(2), \ldots, y(N)$. The result is in the signal vector d
3. The receiver calculates sample-by-sample difference between modulo of d and d: $z(n)=\text{mod}(d(n)$, scaled divisor$)-d(n)$. (modulo is calculated differently depending on the symmetric/asymmetric range)
4. The amplitude-unlimited signal becomes cumsum(z)+y where cumsum( ) refers to cumulative sum/anti-difference operation/inverse of the first-order difference.

The cumulative sum may be equally called anti-difference operation. The anti-difference operation may be defined, for example, according to $$S: \{y(k)\}_{k \in \mathbb{Z}^+} \to \sum_{n=1}^{k} y(n). \tag{7}$$

where y[n] refers to a digital signal at time instant n.

According to the second example of a signal recovery method, a residual function of the digital time-domain signal is first determined at least by subtracting a digital signal obtainable by applying said modulo operation (with said scaled value $\alpha_{sc}$ for the divisor) to an Nth order difference of the digital time-domain signal from the Nth order difference of the digital time-domain signal and applies N successive anti-difference operations to a resulting digital signal (i.e., applying anti-difference operation to each sample of the resulting digital signal and repeating said process N times). Here, N is a positive integer. The residual function corresponds here to a residual function of the modulo operation (with the divisor having the scaled value $\alpha_{sc}$) applied to a digital signal so as to end up with the digital time-domain signal.

In other words, the residual $\Delta^N \epsilon_g$ after applying Nth order difference to the received amplitude-limited signal is first determined according to $$\Delta^N \epsilon_g = \Delta^N y - \text{mod}(\Delta^N y, \alpha_{sc}) \tag{8}$$

Where Nth order difference operator is defined by $\Delta^N$ meaning that the first-order difference $\Delta^1$ is applied repeatedly N times. The received signal vector and the scaled divisor are denoted by y and $\alpha_{sc}$, respectively. The values of the residual function are rounded to the nearest integer multiple of said scaled value of the divisor multiplied by two (i.e., integer multiple of $2\alpha_{sc}$) and ambiguity in the signal reconstruction is resolved. The process is iterated to calculate the residual $\epsilon_g$ which is added to the received amplitude-limited signal to reconstruct the amplitude-unlimited signal.

As mentioned above, the signal recovery may, in some embodiments, be carried out for the amplitude of the digital time-domain signal. Thus, a residual function of the amplitude of the digital time-domain signal may be determined at least by subtracting a digital signal obtainable by applying said modulo operation (with said scaled value $\alpha_{sc}$ for the divisor) to an Nth order difference of the amplitude of the digital time-domain signal from the Nth order difference of the amplitude of the digital time-domain signal and apply N successive anti-difference operations to a resulting digital signal (i.e., applying anti-difference operation to each sample of the resulting digital signal and repeating said process N times).

After the residual function has been determined, an amplitude-unlimited digital time-domain signal (equally called a non-amplitude-limited digital time-domain signal) may be derived based on the residual function and the digital time-domain signal. The amplitude-unlimited digital time-domain signal may be derived by calculating a sum of the digital time-domain signal and the residual function. If the modulo-operation was applied to the amplitude only, the amplitude of the amplitude-unlimited digital time-domain signal may be derived by calculating a sum of the amplitude of the digital time-domain signal and the residual function (for the amplitude).

The first recovery method is a special case of the second recovery method containing only one iteration.

Then for the second recovery method:
5. The receiver calculates order N difference of the received amplitude-limited signal y, d=diff(y,N) i.e. repeats first-order difference N times.

---

The receiver calculates $z = \text{mod}(d, \beta_{sc}) - d$.
For n = 0:N−2
 1. z = cumsum(z)
 2. Round the values in z to the nearest multiple of range $2\beta_{sc}$.
 3. Determine a constant C that will be added to z
 4. z = z + C
end
$\tilde{y}$ = cumsum(z) + y

--- where $\tilde{y}$ is the amplitude-unlimited signal. If the oversampling rate L is at least $2\pi e$, where e refers to Euler's number, the amplitude-unlimited signal can be recovered perfectly. The difference order N sufficient to the recovery is determined based on the scaled divisor, oversampling rate, and the dynamic range of the amplitude-unlimited signal as $$N = \operatorname{ceil}(\log(\beta_{sc}/x_{max}) - \log(\pi e/L)) \quad (9)$$

where $x_{max}$ refers to the maximum amplitude of the transmitted amplitude-unlimited signal scaled in the similar manner as the scaled divisor, e denotes Euler's number and L is the oversampling factor. The maximum amplitude of the transmitted amplitude-unlimited signal can be signaled to the receiver, or it can be stored in a look-up table based on the modulation format. "Ceil" corresponds to a ceiling function outputting the smallest integer greater than or equal to the input. The value $\beta_{sc}$ denotes the half of the range of the region. Thus, in case of the symmetric region $(-\alpha_{sc}, \alpha_{sc})$, $\beta_{sc} = \alpha_{sc}$, and for asymmetric region $[0, \alpha_{sc})$, $\beta_{sc} = \alpha_{sc}/2$.

A first-order difference of the signal+constant is the same as the first-order difference of the signal, i.e. a constant sequence is in the kernel of the first-order difference operator. This causes ambiguity in the signal reconstruction which cannot be resolved if the difference is calculated only once. The ambiguity can be resolved when applying higher order difference operator, by observing that the constant sequence in kth order difference becomes a ramp sequence in (k−1)th order difference. The constant C at iteration n can be determined by $$C = \operatorname{floor}((d_2(1) - d_2(J+1)/(12x_{max}) + 1/2) \quad (10)$$

where the sequence $d_2$ is given by $d_2$=diff (y,N−n+2) and $x_{max}$ refers to the maximum amplitude of the transmitted amplitude-unlimited signal scaled in the similar manner as the scaled divisor. "floor" corresponds to a floor function (i.e., a function outputting the greatest integer less than or equal to the input).

When index $J=6x_{max}/\beta_{sc}$ there is only one integer value in the range and C is uniquely defined The first signal recovery method can be found similar to phase unwrapping (with the difference that method is not applied to phase). The first signal recovery method may be used for error-free signal recovery as long as the pre-defined value α of the divisor is defined such that a norm of a first order difference calculated for the original transmitted digital time-domain signal before the modulo-based PAPR reduction is smaller than said pre-defined value for all samples. In other words, the following equation holds:

$$\|\Delta^1 x\| < \alpha, \quad (11)$$

wherein x is the transmitted digital time-domain signal (i.e., the transmitted digital time-domain signal following any up-sampling and/or waveform processing such as filtering) and $\Delta^1$ denotes the first order difference operator.

If the above condition for the first-order difference is not satisfied, the original signal cannot be recovered without errors using the first signal recovery method. In such a case, the maximum of the norm of the first-order difference can be decreased by oversampling in the radio receiver independently of the oversampling in the radio transmitter so as to satisfy the condition. Nevertheless, the first signal recovery algorithm will, even then, depend on α.

The second signal recovery method does not have this limitation regarding a. In the absence of noise, the amplitude-unlimited digital time-domain signal (i.e., the original signal transmitted by the radio transmitter) can be recovered perfectly using the second signal recovery method as long as the reception oversampling factor is sufficiently large. In some embodiments, the reception oversampling factor may be smaller than 2πe being equal to or larger than 2 or equal to or larger than 2.5, for example. Lower oversampling factor and additional noise in the channel may produce errors in signal recovery, which can be detected and corrected by further processing.

As mentioned above, the propagation channel scales the transmitted signal which, in turn, leads also to scaling of the pre-defined value of the divisor of the modulo-based operation (α). In case of flat fading, the scaling can be directly included in one or more threshold values for adapting or scaling the divisor. The threshold may be indicated for example in a control signalling frame data packet or signal block based or it may be semi-persistent or updated on need-base. If the VGA 507 of the radio receiver (or transceiver) operates optimally, the dynamic range of the analog-to-digital converter (and thus the dynamic range of the digital time-domain signal) matches the dynamic range of the received radio signal. In this case, the scaled value of the divisor of the modulo-based operation $\alpha_{sc}$ may be simply equal to said dynamic range of the (amplitude-limited) digital time-domain signal divided by two.

It should be appreciated that if the pre-defined value of the divisor α is mapped to a part of the amplitude-limited analog signal transmitted by the radio transmitter or transceiver not affected by the modulo-based operation (e.g., to a preamble), the radio receiver may be configured to estimate power of the part of the (amplitude-limited) digital time-domain signal received (and A/D-converted) by the radio receiver to which a is mapped and to determine α_sc based on said power.

A method to detect and correct errors in signal recovery is change point detection. The method searches for changes in a model signal. Change point detection methods are divided into two main branches: online methods that detect changes in real-time and offline methods that detect changes when all samples (for example of a block) are received. The former is often called event or anomaly detection and the latter signal segmentation. Change point detection comprises cost function determination, searching the change points/anomalies and a balancing phase. The cost function is low, when there are no change points and large, if there are many change points. The balancing parameter is selected such that it "filters out" the effect of noise in a radio path.

In the literature it is known many options for the cost function. They either search for a known number of changes or unknown number of changes. Some methods are maximum likelihood estimation, piece-wise linear regression, Mahalanobis-type metric, as examples or parametric methods. Non-parametric methods are also presented, such as non-parametric maximum likelihood estimation, rank-based detection, and kernel-based detection. Methods for the searching are also presented, such as optimal detection and approximate detection. For determining the constraint for the balancing phase various methods have also presented, for example linear penalty and fused lasso.

The pilot/preamble signal normally transmitted in communication systems is not affected by modulo-based operation in the transmitter. Parameters for the change point algorithm are tuned such that the algorithm does not detect any change during the preamble. This can be seen as a training or calibration phase of the receiver.

Here, possible indices where the receiver operation may cause the mean to change are usually known. These are the points where the correction term is added to the receiver signal. However, this detects only the cases when the correction term was added but it was wrong, not the case when the correction term should have been added but it was missing. The mean typically changes in the multiples of 2*scaled divisor In block 410, signal detection process is carried out to the generated amplitude-unlimited digital-form time domain signal.

All detection methods are suitable for this purpose.

The method ends in block 412. The method may be carried out blockwise, but other options are also possible depending on applied radio standard, calculation capacity, delay limitations etc.

Figure 5:
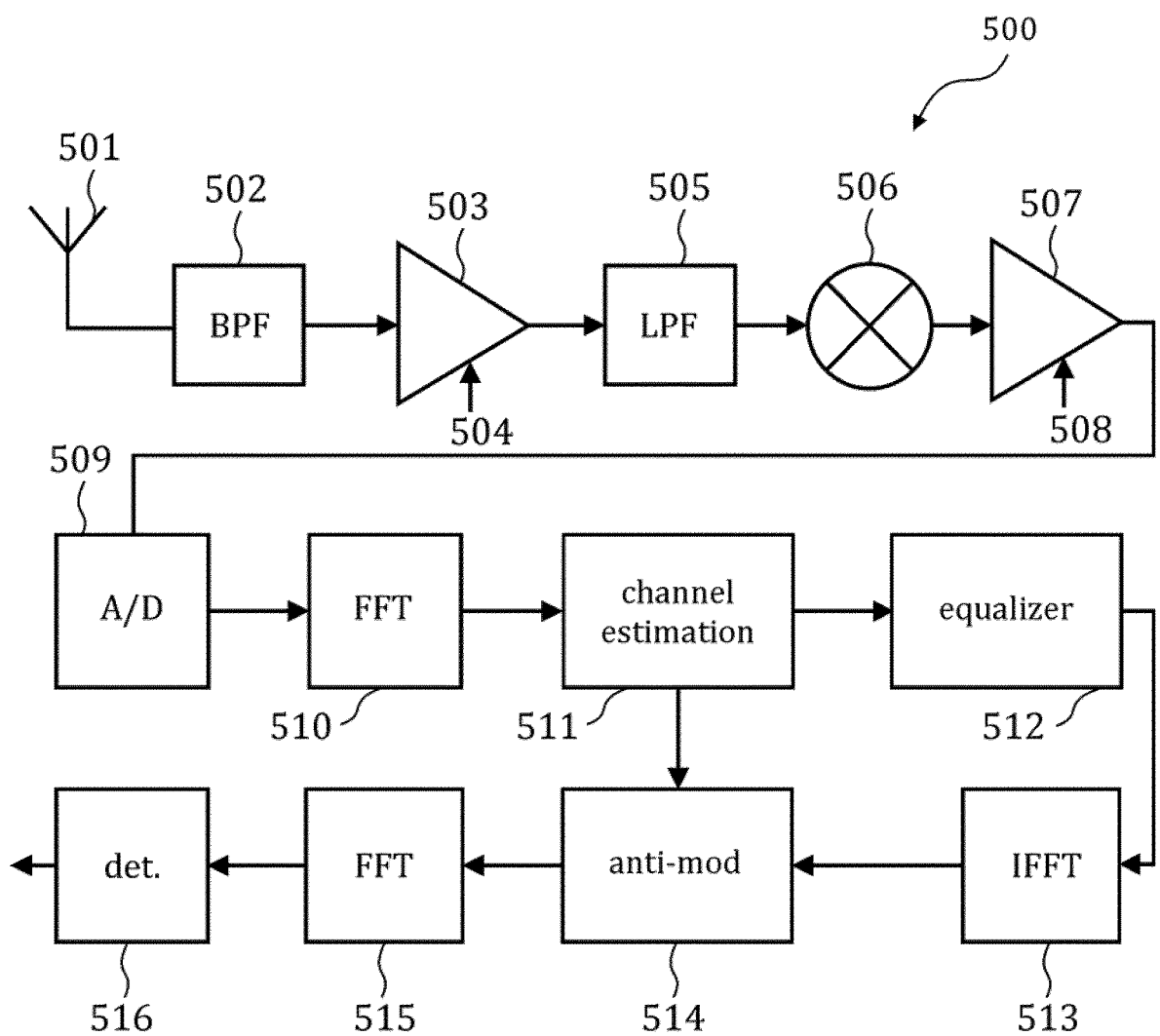
FIG. 5 illustrates an example of a radio receiver structure.

FIG. 5 illustrates an example of a radio receiver structure for operations described above by means of FIG. 4. The illustrated apparatus 500 may be an OFDM radio receiver, but not limited to. The apparatus 500 may form a part of a radio transceiver. The apparatus 500 may be comprised in an access node (such as the access node 104 of FIG. 1) or in a terminal device (such as one of the terminal devices 100, 102 of FIG. 1).

Referring to the example of FIG. 5, the elements 501 to 508 may correspond to an RF front end of the radio receiver 500 (or a part thereof). It should be noted that FIG. 3 shows only one simplistic example of a radio front end. In other embodiments, further elements conventionally included in a receiver RF front end. Said further elements may comprise, e.g., one or more of the following elements: a filter, an image rejection filter, a switch, a divider (for forming I and Q reception branches for feeding I and Q ports of the IQ mixer), a local oscillator, a duplexer, a baseband filter, a baseband amplifier, an intermediate frequency (IF) filter and an IF amplifier.

The RF front end of the radio receiver may comprise at least one antenna 501, a bandpass filter (BPF) 502, a low-noise amplifier 503 (biased with DC bias voltage 504), low-pass filter 505, a mixer 506 (e.g., an IQ mixer) and a variable gain amplifier 507 (biased with DC bias voltage 508). Thus, in reception, a radio frequency signal transmitted by a source transmitter or transceiver (e.g., according to the process discussed in connection with FIGS. 2 and/or 3) may initially be received via said at least one antenna 501 of the radio receiver. The received analog signal may be bandpass-filtered using the bandpass filter (BPF) 502, amplified by the low-noise amplifier 503 and low-pass filtered by the low-pass filter (LPF) 505. In some embodiments, one or both of the filters 502, 505 may be omitted.

The filtered and amplified radio frequency signal may be mixed with a local oscillator signal, in the mixer 506, to create a lower frequency analog (baseband) signal for reception. Said lower frequency analog signal may further be amplified using the variable gain amplifier 507 (i.e., an amplifier which may be configured to vary its gain depending on a control voltage). In some embodiments, the variable gain amplifier 507 may be omitted.

The actions pertaining to blocks 509 to 516 may be carried out digitally by at least one digital processing unit of the radio receiver (e.g., a baseband processing unit).

Following the processing in the RF front end, the resulting (filtered mixed and amplified) analog signal may be converted to a digital time-domain signal in an analog-to-digital converter 509, similar to as discussed in connection with block 401 of FIG. 4. In some embodiments, oversampling by a pre-defined reception oversampling factor may be employed in the analog-to-digital conversion, as discussed above.

In some embodiments, the analog-to-digital converter 509 may correspond to a folding analog-to-digital converter.

The radio receiver may apply, in block 510, an orthogonal transform to the digital time-domain signal to form a corresponding a digital frequency-domain signal. Here, the orthogonal transform may be one of a fast Fourier transform, a discrete Fourier transform, a Hartley transform and a number theoretic transform, similar to above embodiments.

The radio receiver may carry out, in block 511, channel estimation based on at least one preamble and/or at least one pilot symbol comprised in the digital frequency-domain signal. The channel estimation may comprise at least deriving channel state information (CSI) describing channel properties of a communication link between the radio receiver and the source transmitter.

Subsequently, the radio receiver may carry out, in block 512, equalization for the digital frequency-domain signal based at least on the channel estimation to form an equalized digital frequency-domain signal. In other words, the radio receiver adjusts the digital frequency-domain signal so as to reverse effects of distortion (by dispersion) incurred by a signal transmitted through a radio channel based at least on the results of the channel estimation (e.g., according to the CSI).

Following the equalization, the radio receiver may apply, in block 513, an inverse orthogonal transform to the equalized digital frequency-domain signal to form an equalized digital time-domain signal for reconstruction. The inverse orthogonal transform is an inverse of said orthogonal transform.

The radio receiver may reconstruct, in block 514, an amplitude-unlimited digital time-domain signal based on the (equalized) digital time-domain signal and said pre-defined or dynamically determined scaled value for the divisor $\alpha_{sc}$ using a signal recovery method. Examples of the reconstruction process are described in further detail above by means of FIG. 4.

The arrow connecting blocks 511, 514 may imply that results of the channel estimation (e.g., the channel gain) may be used for tuning said scaled value for the divisor $\alpha_{sc}$.

The radio receiver may apply, in block 515, an orthogonal transform to the amplitude-unlimited time-domain signal to form an amplitude-unlimited frequency-domain signal. Again, the orthogonal transform may be one of a fast Fourier transform, a discrete Fourier transform, a Hartley transform and a number theoretic transform. The radio receiver is able to carry out, in block 516, (OFDM, for example) symbol detection (demodulation) based on the amplitude-unlimited frequency-domain signal.

In some embodiments, the actions described in connection with blocks 506 to 515 may be carried out for two separate signals corresponding to I and Q signal components of the received signal. In other words, the elements 506 to 515 may correspond to elements for processing an I signal component while another corresponding set of elements (not shown in FIG. 5) may be provided for processing a Q signal component (or vice versa). Thus, the elements 506 to 515 shown in FIG. 5 may correspond to an I branch of the radio receiver while Q branch of the radio receiver comprising similar elements is not shown in FIG. 3 for simplicity of presentation. The elements 506 to 515 (or a part thereof) may be defined in a substantially similar manner for both I and Q branches.

The received radio signal may be divided into (identical) I and Q reception branches before the IQ mixer 506 using a divider (not shown in FIG. 3). In other words, the elements 501 to 505 may form a singular reception branch which may be divided into I and Q reception branches before the IQ mixer 506. Thus, the elements 501 to 505 may not be duplicated while two mixers 506 (forming together a single IQ mixer) and two VGAs 507 need to be provided for IQ reception.

Assuming that the filtered and amplified radio frequency signal outputted by the low-pass filter 505 corresponds to an in-phase signal, the mixer 506 may be configured to mix the filtered analog time-domain signal with an in-phase (0°) local oscillator signal for creating an I signal component of the analog (baseband) signal. Another mixer (not shown in FIG. 3) may be configured to mix another filtered analog time-domain signal corresponding Q branch of the radio receiver 500 with a quadrature (90°) local oscillator signal for creating a Q signal component of the analog (baseband) signal. Said two mixers 506 may correspond to two (double-balanced) mixers or mixer cores 506 forming together an IQ mixer. The local oscillator signals may be generated, e.g., by a local oscillator via a 0°/90° phase shifting element (not shown in FIG. 3).

Figure 6:
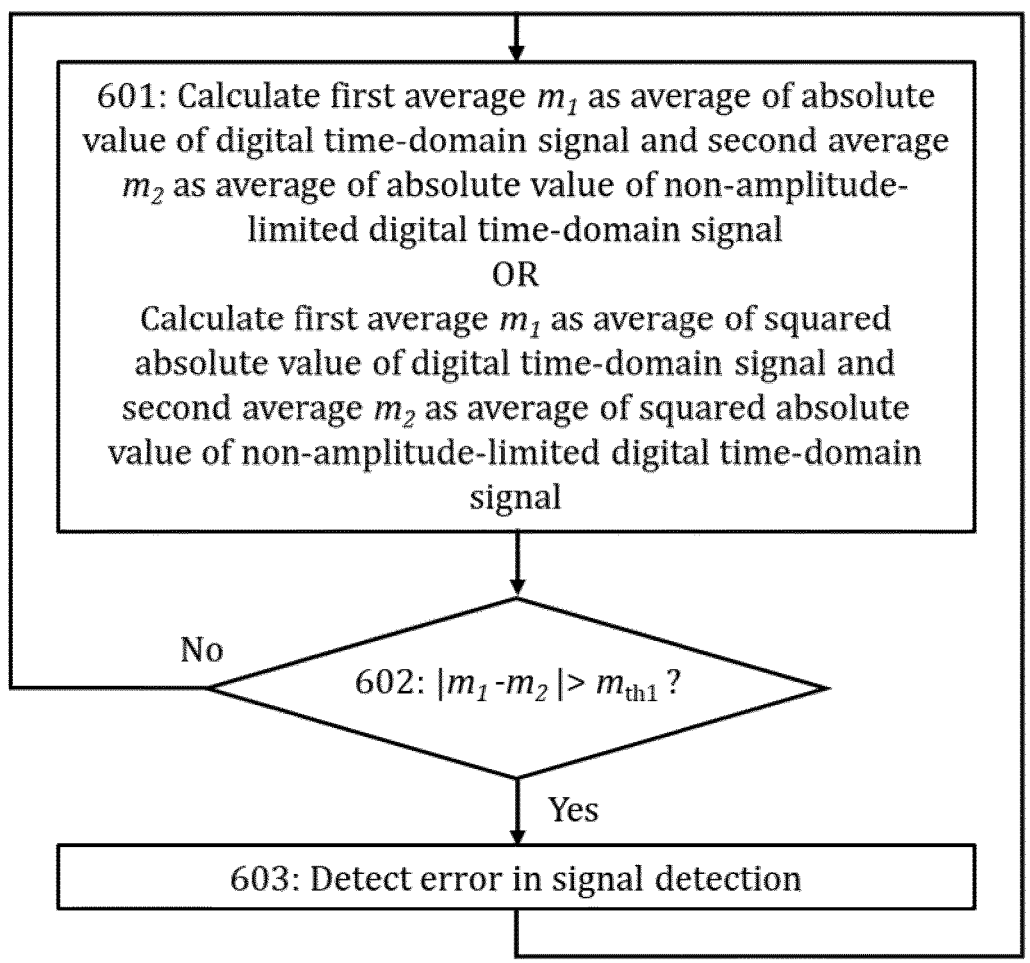
FIG. 6 illustrates an example of error detection.
Figure 7:
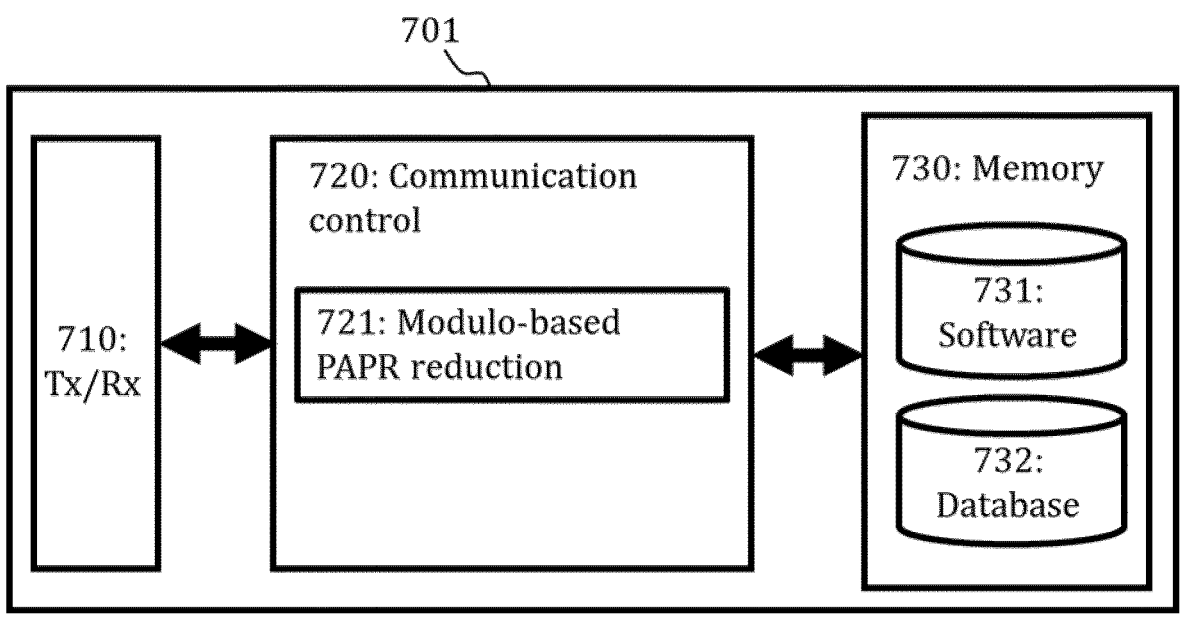
FIGS. 7 and 8 illustrate examples of apparatuses.

While perfect signal recovery may be achieved in ideal circumstances without noise, in practice, thermal noise may cause error events in the signal recovery. Therefore, it would be beneficial if the radio receiver is configured, firstly, to detect such error events and, secondly, to carry out error correction when an error event is detected. FIGS. 6 and 7 illustrate examples of suitable methods based on change point detection. Both of the illustrated processes are based on the fact that, in the case of an error event, the recovered signal deviates from the true (scaled) signal by an integer multiple of $+2\alpha_{sc}$ or $-2\alpha_{sc}$ ($\alpha_{sc}$ being the scaled value of the divisor in the modulo-based operation used in the modulo-based PAPR reduction).

Referring to FIG. 6, an example method to detect whether an amplitude-unlimited digital time-domain signal was recovered correctly or if something went wrong with recovery resulting in a signal which does not correspond to the original transmitted signal.

In block 601, a first average $m_1$ and a second average $m_2$ are determined based on the (amplitude-limited) digital time-domain signal (y) and the amplitude-unlimited digital time-domain signal ($\tilde{y}$). Said first and second averages may be calculated in two alternative ways.

According to the first alternative, the first average $m_1$ as an average of an absolute value of the digital time-domain signal and the second average $m_2$ as an average of an absolute value of the amplitude-unlimited digital time-domain signal. In other words, the first and second averages are determined according to $m_1$=mean (|y|) and $m_2$=mean (|$\tilde{y}$|), where "mean" corresponds to a function for calculating an average. The first threshold may be tuned so as to achieve sufficiently high probability of detection with sufficiently low false alarm rate.

According to the second alternative, the first average $m_1$ is determined as an average of a squared absolute value of the digital time-domain signal and the second average $m_2$ is determined as an average of a squared absolute value of the amplitude-unlimited digital time-domain signal. In other words, the apparatus may calculate the first and second averages according to $m_1$=mean (|y|²) and $m_2$=mean (|$\tilde{y}$|²).

If an absolute difference between the first and second averages is larger than a first pre-defined threshold (i.e., the equation $|m_1-m_2|>m_{th}$ holds true, $m_{th}$ being the first pre-defined threshold) (in block 602), in block 603, an error in signal detection (or equally in signal recovery) is detected. When an error is detected, the signal block may be discarded, or some error correction method may be used.

Reducing PAPR may cause out-of-band interference. Those interference is also referred as sidelobe interference and off-guard interference. Considering the congested spectrum, this interference results in interference to the existing communication channels. To deal with such interference and suppressing it, a range of solutions may be employed such as sidelobe cancellation filter(s), pulse shaping and applying transform(s). The value of the proposed mechanism lies on being compatible with those techniques and the sidelobe interference results from modulo-samples can be applied without losing benefit of the proposed mechanism.

The blocks, related functions, and information exchanges described above by means of FIGS. 1, 2, 3, 4, 5, and 6 in no absolute chronological order, and some of them may be carried out simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

FIG. 7 provides an apparatus 701 according to some embodiments.

FIG. 7 may, e.g., illustrate an apparatus 701 for a radio transmitter or transceiver (i.e., an apparatus comprised in a radio transmitter or transceiver). The apparatus 701 may be configured to carry out at least the functions described above in connection with modulo-based PAPR reduction in transmission. The apparatus 701 may be comprised in a terminal device or an access node such as in one of the terminal devices 100, 102 of FIG. 1 or the access node 104 of FIG. 1. A more detailed description of an example of a suitable apparatus is presented by means of FIGS. 3 (transmitter side) and/or 4 (receiver side) above.

The apparatus may comprise means (720) for generating a digital-form time-domain signal, means (720, 721) for carrying out a modulo-based operation out to an amplitude of the generated digital-form time-domain signal or to in-phase and quadrature branches of the generated digital-form time-domain signal separately, wherein a divisor of the modulo-based operation has a pre-defined value smaller than a maximum of an amplitude of the digital-form time-domain signal for limiting a peak-to-average ratio of the digital-form time-domain signal, and means (720, 710) for carrying out digital-to-analogue conversion to the digital form time-domain signal for transmission.

The apparatus 701 may comprise one or more communication control circuitry or unit comprising one or more processors 720 (possibly comprising modulo-based PAPR reduction unit or module 721), and at least one memory 730, suitable for executing a computer program code (software) or portions thereof, wherein the at least one memory and the computer program code (software 731) are configured, with the at least one processor, to cause the apparatus to carry out any one of the functionalities of the apparatus described above. Said at least one memory 730 may also comprise at least one database 732.

Referring to FIG. 7, the memory 730 may be implemented using any suitable data storage technology, such as semiconductor-based memory devices, flash memory, magnetic memory devices and systems, optical memory devices and systems, fixed memory, and removable memory.

Referring to FIG. 7, the apparatus 701 may further comprise different interfaces 710 such as one or more communication interfaces (TX/RX) comprising hardware and/or software for realizing communication connectivity according to one or more communication protocols. The one or more communication interfaces 710 may comprise, for example, interfaces providing a connection to the Internet and a core network of a wireless communications network. The one or more communication interface 710 may provide the apparatus with communication capabilities to communicate in a cellular communication system and enable communication between user devices (terminal devices) and different network nodes or elements and/or a communication interface to enable communication between different network nodes or elements, for example. The one or more communication interfaces 710 may comprise standard well-known components such as an amplifier, filter, frequency-converter, (de) modulator, and encoder/decoder circuitries, controlled by the corresponding controlling units, and one or more antennas.

Figure 8:
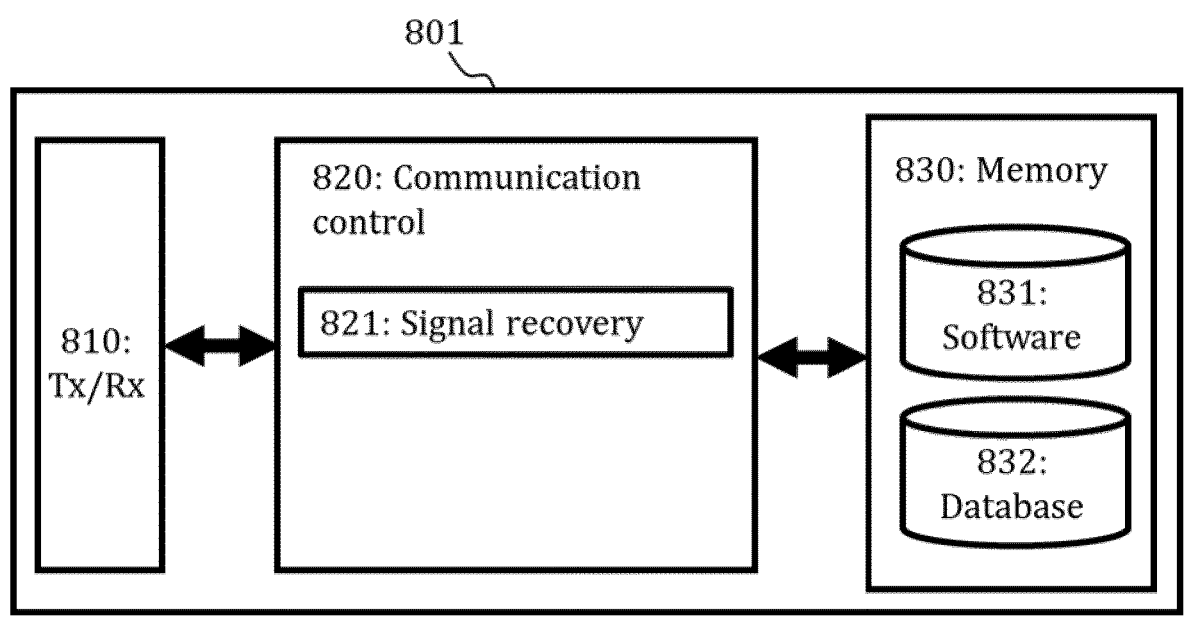

FIG. 8 provides an apparatus 801 according to some embodiments. FIG. 8 may illustrate, e.g., an apparatus 801 for a radio receiver or transceiver (i.e., an apparatus comprised in a radio receiver or transceiver). The apparatus 801 may be configured to carry out at least the functions described above in connection with signal recovery in reception following modulo-based PAPR reduction in transmission. The apparatus 801 may be comprised in a terminal device or an access node such as in one of the terminal devices 100, 102 of FIG. 1 or the access node 104 of FIG. 1. A more detailed description of an example of a suitable apparatus is presented by means of FIGS. 3 (transmitter side) and/or 4 (receiver side) above.

The apparatus may comprise means (820, 830) for obtaining a divisor used in a modulo-based operation in peak-to-average power ratio limitation of a signal for transmission in a propagation channel, means (820, 830) for obtaining an amplitude-limited digital-form time domain signal from the signal transmitted in the propagation channel, means (820, 821) for adapting the divisor using a scaling factor for decreasing the influence of the propagation channel, means (820, 821) for generating an amplitude-unlimited digital-form time domain signal by: carrying out a process of determining a plurality of difference values indicative to the amplitude-limited signal, in the case a difference value of the plurality of difference values is greater than the divisor as adapted it is decreased proportionally to the divisor as adapted, in the case a difference value of the plurality of difference values is less than the divisor as adapted it is increased proportionally to the divisor as adapted, wherein the increased difference value is used to increase subsequent difference values of the plurality of difference values and composing the amplitude-unlimited digital-form time domain signal by using the amplitude-limited signal and the plurality of difference values as increased, decreased or unchanged, and means (820) for carrying out signal detection process to the generated amplitude-unlimited digital-form time domain signal.

The apparatus 801 may comprise one or more communication control circuitry or unit 820 (possibly comprising a signal recovery unit or module 821), such as at least one processor, and at least one memory 830, including a computer program code (software 831) or portions thereof, wherein the at least one memory and the computer program code (software) are configured, with the at least one processor, to cause the apparatus to carry out any one of the functionalities of the apparatus described above. Said at least one memory 830 may also comprise at least one database 832.

Referring to FIG. 8, the memory 830 may be implemented using any suitable data storage technology, such as semiconductor-based memory devices, flash memory, magnetic memory devices and systems, optical memory devices and systems, fixed memory, and removable memory.

Referring to FIG. 8, the apparatus 801 may further comprise different interfaces 810 such as one or more communication interfaces (TX/RX) comprising hardware and/or software for realizing communication connectivity according to one or more communication protocols. The one or more communication interfaces 810 may comprise, for example, interfaces providing a connection to the Internet and a core network of a wireless communications network. The one or more communication interface 810 may provide the apparatus with communication capabilities to communicate in a cellular communication system and enable communication between user devices (terminal devices) and different network nodes or elements and/or a communication interface to enable communication between different network nodes or elements, for example. The one or more communication interfaces 810 may comprise standard well-known components such as an amplifier, filter, frequency-converter, (de) modulator, and encoder/decoder circuitries or units, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to carry out various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2, 3, 4, 5, 6, 7 and 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2, 3, 4 5, 6, 7 and 8 or operations thereof.

Embodiments as described may also be carried out in the form of a computer process defined by a computer program or portions thereof. Embodiments of the methods described in connection with FIGS. 2, 3, 4, 5, 6, 7 and 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code, the at least one memory and computer program code configured to, with the at least one processor, cause the apparatus to:
   generate a digital-form time-domain signal;
   carry out a modulo-based operation to an amplitude of the generated digital-form time-domain signal or to in-phase and quadrature branches of the generated digital-form time-domain signal separately, wherein a divisor of the modulo-based operation has a pre-defined value smaller than a maximum of an amplitude of the digital-form time-domain signal for limiting a peak-to-average ratio of the digital-form time-domain signal, and carry out digital-to-analogue conversion to the digital form time-domain signal for transmission.

2. The apparatus of claim 1, further comprising causing the apparatus to carry out radio frequency processing before the transmission.

3. The apparatus of claim 1, further comprising causing the apparatus to:
   low-pass-filter the digital-form time-domain signal after the modulo-based operation and before the digital-to-analogue conversion for decreasing out-of-band distortion.

4. The apparatus according to claim 1, further comprising causing the apparatus to transmit a pilot or preamble signal not modified by the modulo-based operation.

5. The apparatus according to claim 1, further comprising causing the apparatus to:
   transmit information on the divisor using a control signalling message or as a control part of the transmission not affected by the modulo-based operation.

6. An apparatus comprising:
   at least one processor; and
   at least one memory including computer program code, the at least one memory and computer program code configured to, with the at least one processor, cause the apparatus to:
   obtain a divisor used in a modulo-based operation in peak-to-average power ratio limitation of a signal for transmission in a propagation channel,
   obtain an amplitude-limited digital-form time domain signal from the signal transmitted in the propagation channel,
   adapt the divisor using a scaling factor for decreasing the influence of the propagation channel,
   generate an amplitude-unlimited digital-form time domain signal by causing the apparatus to:
   carry out a process of determining a plurality of difference values indicative to the amplitude-limited signal, in the case a difference value of the plurality of difference values is greater than the divisor as adapted it is decreased proportionally to the divisor as adapted, in the case a difference value of the plurality of difference values is less than the divisor as adapted it is increased proportionally to the divisor as adapted, wherein the increased difference value is used to increase subsequent difference values of the plurality of difference values and composing the amplitude-unlimited digital-form time domain signal by using the amplitude-limited signal and the plurality of difference values as increased, decreased or unchanged, and
   carry out signal detection process to the generated amplitude-unlimited digital-form time domain signal.

7. The apparatus according to claim 6, wherein the obtained amplitude-limited digital-form time domain signal is amplitude-limited in the transmission side by carrying out the modulo-based operation either to an amplitude of a digital-form time-domain signal or to in-phase and quadrature branches of the digital-form time-domain signal separately, and applied manner is indicated.

8. The apparatus according to claim 6, wherein the obtaining the divisor is carried out by using a control signalling message or as a control part of the transmission not affected by the modulo-based operation.

9. The apparatus according to claim 6, wherein the obtaining the amplitude-limited digital-form time domain signal comprises reception via at least one antenna and radio frequency processing and analog-to-digital conversion.

10. The apparatus according to claim 6, wherein the obtaining the amplitude-limited digital-form time domain signal comprises reception via at least one antenna and radio frequency processing and analog-to-digital conversion with oversampling.

11. The apparatus according to claim 6, wherein the adapting the divisor using a scaling factor for decreasing the influence of the propagation channel, in the case of flat fading, comprises using an indicated threshold.

12. The apparatus according to claim 6, further comprising:
receiving a pilot or preamble signal not modified by the modulo-based operation,
using the pilot or preamble signal in channel estimation for equalization of a digital-form time domain signal, the equalization being carried out before the generating the amplitude-unlimited digital-form time domain signal.

13. A method, comprising:
obtaining a divisor used in a modulo-based operation in peak-to-average power ratio limitation of a signal for transmission in a propagation channel,
obtaining an amplitude-limited digital-form time domain signal from the signal transmitted in the propagation channel,
adapting the divisor using a scaling factor for decreasing the influence of the propagation channel,
generating an amplitude-unlimited digital-form time domain signal by:
carrying out a process of determining a plurality of difference values indicative to the amplitude-limited signal, in the case a difference value of the plurality of difference values is greater than the divisor as adapted it is de-creased proportionally to the divisor as adapted, in the case a difference value of the plurality of difference values is less than the divisor as adapted it is in-creased proportionally to the divisor as adapted, wherein the increased difference value is used to increase subsequent difference values of the plurality of difference values and composing the amplitude-unlimited digital-form time domain signal by using the amplitude-limited signal and the plurality of difference values as increased, decreased or unchanged, and
carrying out signal detection process to the generated amplitude-unlimited digital-form time domain signal.

14. The method according to claim 13, wherein the obtained amplitude-limited digital-form time domain signal is amplitude-limited in the transmission side by carrying out the modulo-based operation either to an amplitude of a digital-form time-domain signal or to in-phase and quadrature branches of the digital-form time-domain signal separately, and applied manner is indicated.

15. The method according to claim 13, wherein the obtaining the divisor is carried out by using a control signalling message or as a control part of the transmission not affected by the modulo-based operation.

16. The method according to any of claim 13, wherein the obtaining the amplitude-limited digital-form time domain signal comprises reception via at least one antenna and radio frequency processing and analog-to-digital conversion.

17. The method according to any of claim 13, wherein the obtaining the amplitude-limited digital-form time domain signal comprises reception via at least one antenna and radio frequency processing and analog-to-digital conversion with oversampling.

18. The method according to any of claim 13, wherein the adapting the divisor using a scaling factor for decreasing the influence of the propagation channel, in the case of flat fading, comprises using an indicated threshold.

19. The method according to claim 13, further comprising:
receiving a pilot or preamble signal not modified by the modulo-based operation,
using the pilot or preamble signal in channel estimation for equalization of a digital-form time domain signal, the equalization being carried out before the generating the amplitude-unlimited digital-form time domain signal.

* * * * *